United States Patent
Yamauchi

(10) Patent No.: US 7,930,375 B2
(45) Date of Patent: Apr. 19, 2011

(54) SERVICE PROVIDING APPARATUS, INFORMATION PROVIDING METHOD, AND STORAGE MEDIUM STORING A COMPUTER PROGRAM HAVING SERVICE START AND END NOTIFYING FEATURES

(75) Inventor: Hisayuki Yamauchi, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1194 days.

(21) Appl. No.: 10/846,340

(22) Filed: May 14, 2004

(65) Prior Publication Data
US 2004/0243683 A1 Dec. 2, 2004

(30) Foreign Application Priority Data

May 14, 2003 (JP) .................................. 2003-136144

(51) Int. Cl.
G06F 9/00 (2006.01)
G06F 15/173 (2006.01)
G06F 15/177 (2006.01)
G06K 15/00 (2006.01)

(52) U.S. Cl. ............ 709/221; 358/1.14; 709/220; 713/1
(58) Field of Classification Search .................. 709/223, 709/220, 221; 358/1.14; 713/1
See application file for complete search history.

(56) References Cited

U.S. PATENT DOCUMENTS

| | | | | |
|---|---|---|---|---|
| 5,220,674 A | * | 6/1993 | Morgan et al. ................. | 709/223 |
| 5,323,393 A | * | 6/1994 | Barrett et al. ................. | 370/449 |
| 5,550,957 A | * | 8/1996 | Davidson et al. ............ | 358/1.15 |
| 5,647,056 A | * | 7/1997 | Barrett et al. ................. | 709/220 |
| 5,666,486 A | * | 9/1997 | Alfieri et al. .................. | 709/217 |
| 5,706,411 A | * | 1/1998 | McCormick et al. ........ | 358/1.14 |
| 5,727,135 A | * | 3/1998 | Webb et al. .................. | 358/1.14 |
| 5,754,747 A | * | 5/1998 | Reilly et al. ................. | 358/1.15 |
| 5,787,237 A | * | 7/1998 | Reilly .......................... | 358/1.13 |
| 5,949,553 A | * | 9/1999 | Iimori .......................... | 358/444 |
| 6,031,631 A | * | 2/2000 | Tahara et al. ................. | 358/296 |
| 6,118,996 A | * | 9/2000 | Kowaguchi et al. ....... | 455/422.1 |
| 6,154,782 A | * | 11/2000 | Kawaguchi et al. ......... | 709/239 |
| 6,211,966 B1 | | 4/2001 | Osada | |
| 6,233,414 B1 | * | 5/2001 | Farrell ............................ | 399/81 |
| 6,259,776 B1 | * | 7/2001 | Hunt ....................... | 379/114.01 |
| 6,301,611 B1 | * | 10/2001 | Matsumoto et al. .......... | 709/217 |
| 6,314,476 B1 | | 11/2001 | Ohara | |
| 6,381,442 B1 | * | 4/2002 | Okitsu et al. ................. | 399/405 |
| 6,437,869 B1 | | 8/2002 | Matoba | |
| 6,463,473 B1 | * | 10/2002 | Gubbi .......................... | 709/225 |

(Continued)

FOREIGN PATENT DOCUMENTS

EP 0 809 176 A2 11/1997

(Continued)

*Primary Examiner* — Tonia L Dollinger
*Assistant Examiner* — Daniel C Murray
(74) *Attorney, Agent, or Firm* — Rossi, Kimms & McDowell LLP

(57) ABSTRACT

A service providing apparatus which, even when there is a change in the contents of service provided for terminal devices, enables the terminal devices to register the changed contents of the service in a reliable manner. Upon the start of the service providing apparatus or the service, the service providing apparatus gives the terminal devices a service end notification for nullifying the contents of service registered in the terminal devices. After the service end notification is given, the service providing apparatus gives a service start notification to the terminal devices, and notifies the contents of service to the terminal devices in response to an acquisition request issued from any terminal device based on the service start notification.

8 Claims, 15 Drawing Sheets

U.S. PATENT DOCUMENTS

| | | | |
|---|---|---|---|
| 6,552,813 B2 * | 4/2003 | Yacoub | 358/1.1 |
| 6,567,179 B1 * | 5/2003 | Sato et al. | 358/1.15 |
| 6,615,282 B1 * | 9/2003 | Futral | 710/1 |
| 6,646,758 B1 * | 11/2003 | Anderson et al. | 358/1.15 |
| 6,687,776 B2 * | 2/2004 | Reilly | 710/104 |
| 6,804,022 B2 * | 10/2004 | Fujiwara et al. | 358/1.15 |
| 6,897,974 B1 * | 5/2005 | Coker | 358/1.15 |
| 6,967,738 B1 * | 11/2005 | Shima | 358/1.16 |
| 6,993,591 B1 * | 1/2006 | Klemm | 709/232 |
| 7,020,702 B2 * | 3/2006 | Clark et al. | 709/224 |
| 7,054,899 B1 * | 5/2006 | Yamamoto | 709/202 |
| 7,099,034 B2 * | 8/2006 | Anderson et al. | 358/1.15 |
| 7,107,340 B2 * | 9/2006 | Chkodrov et al. | 709/224 |
| 7,113,296 B1 * | 9/2006 | Tomidokoro et al. | 358/1.15 |
| 7,148,987 B2 * | 12/2006 | Nishio | 358/1.15 |
| 7,167,930 B2 * | 1/2007 | Reilly | 710/15 |
| 7,170,623 B2 * | 1/2007 | Matoba et al. | 358/1.15 |
| 7,213,138 B2 * | 5/2007 | Fukunaga et al. | 710/110 |
| 7,266,822 B1 * | 9/2007 | Boudnik et al. | 718/100 |
| 7,293,268 B2 | 11/2007 | Masuda et al. | |
| 7,312,886 B2 * | 12/2007 | Gomi | 358/1.15 |
| 7,379,958 B2 * | 5/2008 | Karhu | 709/201 |
| 7,401,213 B2 * | 7/2008 | Tateyama et al. | 713/1 |
| 7,430,660 B2 * | 9/2008 | Fukunaga et al. | 713/2 |
| 7,450,254 B2 * | 11/2008 | Tomidokoro et al. | 358/1.14 |
| 7,516,135 B2 * | 4/2009 | Bayyapu | 707/10 |
| 7,599,083 B2 * | 10/2009 | Reese et al. | 358/1.15 |
| 2002/0030840 A1 * | 3/2002 | Itaki et al. | 358/1.13 |
| 2002/0089692 A1 * | 7/2002 | Ferlitsch | 358/1.15 |
| 2002/0147810 A1 * | 10/2002 | Traversat et al. | 709/224 |
| 2003/0005100 A1 * | 1/2003 | Barnard et al. | 709/223 |
| 2003/0134623 A1 * | 7/2003 | Kanamaru et al. | 455/414 |
| 2003/0140153 A1 * | 7/2003 | Lawrence | 709/230 |
| 2003/0184784 A1 * | 10/2003 | Ferlitsch | 358/1.13 |
| 2003/0191823 A1 * | 10/2003 | Bansal et al. | 709/220 |
| 2003/0225820 A1 * | 12/2003 | Chkodrov et al. | 709/201 |
| 2004/0021891 A1 * | 2/2004 | Higuchi et al. | 358/1.14 |
| 2004/0199616 A1 * | 10/2004 | Karhu | 709/221 |
| 2004/0218212 A1 * | 11/2004 | Jang et al. | 358/1.15 |
| 2004/0255030 A1 * | 12/2004 | Sillanpaa | 709/228 |
| 2005/0076118 A1 * | 4/2005 | Burghardt et al. | 709/224 |
| 2005/0125314 A1 * | 6/2005 | Agarwal et al. | 705/30 |
| 2006/0253592 A1 * | 11/2006 | Oashi et al. | 709/227 |
| 2006/0268338 A1 * | 11/2006 | Tomidokoro et al. | 358/1.15 |
| 2006/0268350 A1 * | 11/2006 | Tomidokoro et al. | 358/402 |
| 2006/0268351 A1 * | 11/2006 | Tomidokoro et al. | 358/402 |
| 2006/0290969 A1 * | 12/2006 | Tomidokoro et al. | 358/1.14 |
| 2009/0228591 A1 * | 9/2009 | Mitsunobu et al. | 709/226 |
| 2009/0271837 A1 * | 10/2009 | Kim et al. | 725/110 |
| 2009/0292772 A1 * | 11/2009 | Uchikawa | 709/204 |

FOREIGN PATENT DOCUMENTS

| | | |
|---|---|---|
| EP | 1330100 A2 * | 7/2003 |
| JP | 11-191086 A | 7/1999 |
| JP | 2001-209504 A | 8/2001 |
| JP | 2002-007138 A | 1/2002 |

* cited by examiner

FIG. 3

```
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
<env:Body>
<bm:create_job xmlns:bm="urn:schemas-bmlinks-jp:service:bmlinks-1-2">
<requesting-user-name>user1</requesting-user-name>
<job-instruction>
<job-instruction-params>
<job-name>sample-job</job-name>
<optional-attributes-fidelity>false</optional-attributes-fidelity>
<copies>1</copies>
<sides>two-sided-long-edge</sides>
<finishings enc:arrayType="bm:Finishing[1]">
<finishing>staple</finishing>
</finishings>
<document-format>image/tiff</document-format>
</job-instruction-params>
<notification-instruction>
<notification-recipient>http://192.168.1.5/event</notification-recipient>
<events enc:arrayType="bm:Event[2]">
<event>job-completed</event>
<event>job-canceled</event>
</events>
</notification-instruction>
</job-instruction>
</bm:create_job>
</env:Body>
</env:Envelope>
```

FIG. 4

```
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
    <env:Body>
        <bm:create_jobResponse xmlns:bm="urn:schemas-bmlinks-jp:service:bmlinks-1-2">
            <result-code>ok</result-code>
            <job-id>1</job-id>
            <notification-subscription-id>1</notification-subscription-id>
            <data-sink-uri>
                http://192.168.1.4/job001
            </data-sink-uri>
        </bm:create_jobResponse>
    </env:Body>
</env:Envelope>
```

FIG. 6

```
POST /job001 HTTP/1.1
Host: Cannon-Printer
Content-Length: nnn
```

FIG. 7

```
HTTP/1.1 200 OK
```

*FIG. 8*

```
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
 <env: Body>
  <env: Fault>
   <faultcode>env:Sender</faultcode>
   <faultstring>Sender Error</faultstring>
   <detail>
    <bm:fault-information xmlns:bm="urn:schemas-bmlinks-jp:service:bmlinks-1-2">
     <result-code>conflicting-attributes</result-code>
    </bm:fault-information>
   </detail>
  </env: Fault>
 </env: Body>
<env: Envelope>
```

*FIG. 9*

```
NOTIFY * HTTP/1.1
Host: 239.255.255.250:1900
Cache-Control: max-age=1800
Location: http:// 192.168.1.4:1234/bmlinks/print/ddf.xml
NT: schemas-bmlinks-jp:device:bmlinks:1
NTS: ssdp:alive
Server: VxWorks/2.0 UPnP/1.0 iRC3200/1.3
USN: urn:schemas-bmlinks-jp:device:bmlinks:1
BMDC: http:// 192.168.1.4:1234./bmlinks/bmdc/
```

FIG. 10

```
NOTIFY * HTTP/1.1
Host: 239.255.255.250:1900
NT: urn:schemas-bmlinks-jp:device:bmlinks:1
NTS: ssdp:byebye
USN: schemas-bmlinks-jp:device:bmlinks: 1
```

FIG. 11

```xml
<?xml version="1.0" encoding="UTF-8" ?>
<root xmlns="urn:schemas-upnp-org:device-1-0">
  <specVersion>
    <major>1</major>
    <minor>0</minor>
  </specVersion>
  <URLBase>http://192.168.1.4</URLBase>
  <device>
    <deviceType>urn:schemas-bmlinks-jp:device:bmlinks:1</deviceType>
    <friendlyName>iRC3200</friendlyName>
    <manufacturer>Cannon</manufacturer>
    <manufacturerURL>http://cannon.jp</manufacturerURL>
    <modelDescription>Cannon MFP/SFP</modelDescription>
    <modelName>iRC3200</modelName>
    <UDN>uuid:041e1ae0-1fdb-11b9-8000-000085077826</UDN>
    <serviceList>
      <service>
        <serviceType>urn:schemas-bmlinks-jp:service:print:1</serviceType>
        <serviceId>urn:bmlinks-jp:serviceId:print-1</serviceId>
        <SCPDURL>/bmlinks/sdf-print_xml</SCPDURL>
        <controlURL>/bmlinks/print</controlURL>
        <eventSubURL>/bmlinks/print</eventSubURL>
      </service>
    </serviceList>
    <presentationURL>/</presentationURL>
    <bm:X_organization xmlns="" xmlns:bm="urn:schemas-bmlinks-jp:types:bmlinks-1-2">
      <O>Cannon(株)</O>
      <C>JP</C>
      <BU>小杉事業所</BU>
      <FL>4</FL>
      <BL>43</BL>
    </bm:X_organization>
    <bm:X_profile-charset-supported xmlns="" xmlns:bm="urn:schemas-bmlinks-jp:types:bmlinks-1-2">
      <profile-charset>utf-8</profile-charset>
    </bm:X_profile-charset-supported>
    <bm:X_profile-language-supported xmlns="" xmlns:bm="urn:schemas-bmlinks-jp:types:bmlinks-1-2">
      <profile-language>jp</profile-language>
    </bm:X_profile-language-supported>
    <bm:X_BMDCURL xmlns="" xmlns:bm="urn:schemas-bmlinks-jp:types:bmlinks-1-2">/bmlinks/bmdc</bm:X_BMDCURL>
  </device>
</root>
```

FIG. 12

```xml
<?xml version="1.0" encoding="UTF-8" ?>
<scpd xmlns="urn:schemas-upnp-org:service-1-0">
  <specVersion>
    <major>1</major>
    <minor>0</minor>
  </specVersion>
  <actionList/>
  <serviceStateTable>
    <stateVariable>
      <name>service-name</name>
      <dataType>urn:schemas-bmlinks-jp:types:upnp-1-0#string</dataType>
      <bm:X_defaultValue xmlns="" xmlns:bm="urn:schemas-bmlinks-jp:types:bmlinks-1-2">iR3300i</bm:X_defaultValue>
      <bm:X_allowedValueList xmlns="" xmlns:bm="urn:schemas-bmlinks-jp:types:bmlinks-1-2">
        <dataType>urn:schemas-bmlinks-jp:types:upnp-1-0#string</dataType>
        <allowedValue>iR3300i</allowedValue>
      </bm:X_allowedValueList>
    </stateVariable>
    <stateVariable>
      <name>document-format</name>
      <dataType>urn:schemas-bmlinks-jp:types:upnp-1-0#string</dataType>
      <bm:X_defaultValue xmlns="" xmlns:bm="urn:schemas-bmlinks-jp:types:bmlinks-1-2">image/tiff</bm:X_defaultValue>
      <bm:X_allowedValueList xmlns="" xmlns:bm="urn:schemas-bmlinks-jp:types:bmlinks-1-2">
        <dataType>urn:schemas-bmlinks-jp:types:upnp-1-0#string</dataType>
        <allowedValue>image/tiff</allowedValue>
      </bm:X_allowedValueList>
    </stateVariable>
    <stateVariable>
      <name>colors</name>
      <dataType>urn:schemas-bmlinks-jp:types:bmlinks-1-2#8</dataType>
      <bm:X_defaultValue xmlns="" xmlns:bm="urn:schemas-bmlinks-jp:types:bmlinks-1-2">0</bm:X_defaultValue>
      <bm:X_allowedValueList xmlns="" xmlns:bm="urn:schemas-bmlinks-jp:types:bmlinks-1-2">
        <dataType>urn:schemas-bmlinks-jp:types:bmlinks-1-2#8</dataType>
        <allowedValue>16777216</allowedValue>
      </bm:X_allowedValueList>
    </stateVariable>
    ......
  </serviceStateTable>
</scpd>
```

FIG. 15

GET /bmlinks/ddf.xml HTTP/1.1

FIG. 16

GET /bmlinks/sdf-print.xml HTTP/1.1

SERVICE PROVIDING APPARATUS, INFORMATION PROVIDING METHOD, AND STORAGE MEDIUM STORING A COMPUTER PROGRAM HAVING SERVICE START AND END NOTIFYING FEATURES

BACKGROUND OF THE INVENTION

1. Field of the Invention

The present invention relates to a service providing apparatus and a data processing apparatus, which are connected to terminal devices via a network such that they can communicate with each other, and are capable of providing service using their functions for the terminal devices, an information providing method, a program for implementing the method, and a storage medium storing the program.

2. Description of the Related Art

In recent years, with the spread of large-scale networks such as the Internet, network technology has been dramatically improved. Under such circumstance, the technology called Web service which provides services on various networks through the linkage of devices connected on the networks using WWW-related technology has widely drawn attention. Among such services, a so-called printing service in which a printing device connected to terminal devices via a network provides service using its functions for the terminal devices has been increasingly used. In this printing service, a terminal device on a network selects a printing device with desired functions from among a plurality of printing devices which are capable of accepting a printing request from the terminal device and carrying out printing, so that printing is carried out using the selected printing device.

As an example of devices which provide such a printing service, a printing device which notifies the start of a service, and lays open device information and service contents on a network has been disclosed in Japanese Laid-Open Patent Publication (Kokai) No. H11-191086. A terminal device connected to the network can access the service on the network by acquiring or retrieving the laid-open information. If the terminal device on the network registers the acquired device information and service contents, it does not have to acquire or retrieve device information on the printing device and service contents each time it uses the service.

For example, the printing device capable of providing the printing service as above notifies the start of service and publicizes device information and service contents, and the terminal device acquires and registers service contents provided by the printing device, in the following ways.

The printing device which provides service, when activated, starts the printing service and transmits a start notification packet which notifies the start of service to a network. On this occasion, the printing device acquires its profile information and service contents which can be provided from the inside of the device, and creates a DDF (Device Description File) in which device information is described and an SDF (Service Description File) in which the contents of service are described. If the printing device which has transmitted the start notification packet to the terminal device is not registered in a terminal device which has received the start notification packet, the terminal device transmits a request to acquire the DDF and the SDF to the printing device according to information included in the start notification packet. Upon reception of the request, the printing device transmits the DDF and the SDF in response to the request, and the terminal device acquires and registers information such as device information on the printing device and service contents according to the DDF and the SDF received from the printing device.

In the case where a plurality of printing devices which provide printing services as above exist on the network, the terminal device registers services provided by the printing devices in the above described way.

In the case where printing is carried out through the operation of a terminal device which has registered services provided by printing devices on a network as described above, the terminal device selects a printing device providing a desired printing service according to information on the contents of the registered services to be provided by the printing devices, and transmits a printing request to the selected printing device to carry out printing.

For example, referring to FIGS. 17A and 17B, a description will now be given of how the printing device is started and the start of service is notified. FIG. 17A is a diagram showing timing in which the start of the conventional printing device and the start of the service are notified, and FIG. 17B is a diagram showing timing in which the start of the printing device and the start of the service are notified in the case where a finisher unit which sorts and/or staples printed matters and a double-sided printing unit are attached or removed after power supply to the printing device is turned off.

A start notification which is transmitted for notification of the start of the printing device and the start of service describes the effective period of the notification, and when the effective period expires, information registered in the terminal device is automatically deleted.

As shown in FIG. 17A, the printing device, upon activation, transmits a start notification packet. The printing device then transmits an update notification packet which, before the effective period of the service expires, updates expiration date (life time) corresponding to the service thereof so as to renew the effective period of the service and allow each terminal device to register information on its service according to each update notification. The each terminal device registers information on the service and expiration date corresponding to the service in accordance with the start notification packet and updates the registered expiration date in accordance with the update notification packet. This update notification packet is transmitted at regular intervals, and the contents thereof are the same as those of the start notification packet.

In ending the service, the printing device transmits an end notification packet which notifies the end of the service to each terminal device. Upon reception of the end notification packet, the terminal device confirms that the printing device has ended the service, and deletes the registered contents of the service.

There may be a case where, within the effective period of the start notification given by the printing device registered in the terminal device, the contents of the service are changed due to a change in the status of the printing device. In such a case, the printing device updates its DDF and SDF, and transmits only a start notification packet. However, since the effective period of the start notification of the printing device registered in the terminal device has not yet expired, the terminal device does not try to acquire the updated DDF and SDF in response to the start notification packet. Consequently, the terminal device cannot detect the change in the contents of the service.

Therefore, when the contents of the service are changed due to a change in the status of the printing device, the printing device transmits an end notification packet. As a result, the contents of the service registered in the terminal device are deleted. Thereafter, the printing device transmits a start notification packet again. As a result, the terminal device acquires the updated DDF and SDF in response to the start notification packet, and registers the contents of the service again.

However, there may be a case where power supply to the printing device is suddenly turned off, and the end notification packet cannot be transmitted. For example, the user turns off power supply to the printing device so as to attach or remove a finisher unit which sorts and/or staples printed matters, or a double-sided printing unit. Then, as shown in FIG. 17B, after power supply to the printing device is turned off, the finisher unit or the double-sided printing unit is attached or removed, which changes the contents of the service provided by the printing device. In this case, when power supply is turned on again, a start notification packet is transmitted, but at this time point, the effective period of the service based on the start or update notification packets has not yet expired. Therefore, the terminal device determines that the start notification packet is indicative of a notification for renewing the effective period, and does not acquire the DDF and SDF updated by the printing device. As a result, even though the contents of the service provided by the printing device have been changed, the terminal device cannot know and register the changed contents of the service.

As stated above, in the case where there is a change in the contents of a service within a period of time from turning-off to turning-on of power supply to the printing device, the terminal device may not acquire the changed contents of the service.

SUMMARY OF THE INVENTION

It is an object of the present invention to provide a service providing apparatus, a data processing apparatus, and an information providing method, which, even when there is a change in the contents of a service provided for terminal devices, enable the terminal devices to reliably register the changed contents of the service, as well as a program for implementing the method and a storage medium storing the program.

To attain the above object, in a first aspect of the present invention, there is provided a service providing apparatus capable of communicating with at least one terminal device via a network, and providing at least one service using functions of the service providing apparatus itself, comprising a service start notifying device that gives a service start notification to the terminal device, a service contents notifying device that notifies contents of the service to the terminal device in response to an acquisition request issued from the terminal device based on the service start notification, and a service end notifying device that gives the terminal device a service end notification for nullifying the contents of the service registered in the terminal device, wherein upon start of the service providing apparatus or the service, the service end notifying device gives the service end notification to the terminal device, and then the service start notifying device gives the service start notification to the terminal device.

According to the first aspect of the present invention, when a service such as a printing service is started, a service end notification for nullifying the contents of the service registered in the terminal device is given to the terminal device, and then a service start notification is given to the terminal device. As a result, even in the case where the contents of a printing service provided for the terminal device have been changed, the changed contents of the service can be reliably registered in the terminal device.

Preferably, the service providing apparatus comprises an update processing device that carries out an updating process for updating the contents of the service after the service start notification is given, and in a case where the contents of the service have been updated, the service end notifying device gives the service end notification, and then the service start notifying device gives the service start notification.

With this arrangement, when the contents of a service have been changed, a service end notification is given to the terminal device, and then a service start notification is given to the terminal device. As a result, even in the case where the contents of a service have been changed due to a change in the status of the printing device during the effective period of the service, the changed contents of the service can be reliably registered in the terminal device.

More preferably, the service providing apparatus comprises a notifying device that gives the terminal device notification indicating that the contents of the service registered in the terminal device are effective, and in a case where the contents of the service have been unchanged, the notifying device gives the notification to the terminal device.

Still more preferably, the service providing apparatus comprises a status change determining device that regularly makes a determination as to whether there is a change in status of the service providing apparatus, and in a case where the status change determining device determines that there is a change in status of the service providing apparatus, the update processing device updates the contents of the service, the service end notifying device gives the service end notification, and then the service start notifying device gives the service start notification.

More preferably, the status change determining device makes the determination at intervals corresponding to an effective period of the service.

To attain the above object, in a second aspect of the present invention, there is provided a service providing apparatus capable of communicating with at least one terminal device via a network, and providing at least one service using functions of the service providing apparatus itself, comprising a service start notifying device that gives a service start notification to the network, a service information notifying device responsive to an acquisition request issued from the terminal device based on the service start notification, for transmitting service information to the terminal device, and a service end notifying device that gives a service end notification to the network, wherein the terminal device nullifies the service information registered in the terminal device in accordance with the service end notification, and wherein upon start of the service providing apparatus or the service, the service end notifying device gives the service end notification to the network, and then the service start notifying device gives the service start notification to the network.

Preferably, the service providing apparatus comprises a printing apparatus that provides a printing function as the service.

Preferably, the service providing apparatus comprises an update processing device that carries out an updating process for updating the service information after the service start notification is given, in a case where the contents of the service have been changed, and wherein in a case where the service information have been updated, the service end notifying device gives the service end notification, and then the service start notifying device gives the service start notification.

More preferably, the service providing apparatus comprises a notifying device that gives the terminal device a notification indicating that the contents of the service registered in the terminal device are effective, and in a case where the contents of the service have been unchanged, the notifying device gives the notification to the terminal device.

Still more preferably, the service providing apparatus comprises a status change determining device that regularly makes a determination as to whether there is a change in status of the service providing apparatus, and in a case where the status change determining device determines that there is a change in status of the service providing apparatus, the update processing device updates the service information, the service end notifying device gives the service end notification, and then the service start notifying device gives the service start notification.

More preferably, the status change determining device makes the determination at intervals corresponding to an effective period of the service.

To attain the above object, in a third aspect of the present invention, there is provided a data processing apparatus capable of communicating with at least one terminal device via a network, and providing a service using functions of the data processing apparatus itself, comprising a start notifying device that gives a function start notification to the terminal device, an apparatus information notifying device responsive to an acquisition request issued from the terminal device based on the function start notification, for notifying apparatus information on the data processing apparatus to the terminal device, and an end notifying device that gives a function end notification to the terminal device, wherein upon start of the data processing apparatus, the end notifying device gives the function end notification to the terminal device, and then the start notifying device gives the function start notification to the terminal device.

According to the third aspect of the present invention, when the data processing apparatus is started, it gives an end notification for nullifying device information registered in the terminal device, and then gives a start notification to the terminal device. As a result, even in the case where device information in the terminal device has been changed, the changed device information can be reliably registered in the terminal device.

To attain the above object, in a fourth aspect of the present invention, there is provided an information processing method that enables an apparatus capable of communicating with at least one terminal device via a network to provide at least one service using functions of the apparatus itself, comprising the steps of giving a service start notification to the terminal device, notifying contents of the service to the terminal device in response to an acquisition request issued from the terminal device based on the service start notification, giving the terminal device a function end notification for nullifying the contents of the service registered in the terminal device, and giving the service end notification to the terminal device upon start of the apparatus or the service, and then giving the service start notification to the terminal device.

To attain the above object, in a fifth aspect of the present invention, there is provided a program for enabling an apparatus capable of communicating with at least one terminal device via a network to provide at least one service using functions of the apparatus itself, comprising a service start notifying module for giving a service start notification to the terminal device, a service contents notifying module for notifying contents of the service to the terminal device in response to an acquisition request issued from the terminal device based on the service start notification, and a service end notifying module for giving the terminal device a function end notification for nullifying the contents of the service registered in the terminal device, wherein upon start of the apparatus or the service, the service end notification is given to the terminal device by the service end notifying module, and then the service start notification is given to the terminal device by the service start notifying module.

To attain the above object, in a sixth aspect of the present invention, there is provided a storage medium storing the program such that the program is readable by a computer.

The above and other objects, features, and advantages of the invention will become more apparent from the following detailed description taken in conjunction with the accompanying drawings.

BRIEF DESCRIPTION OF THE DRAWINGS

FIG. 3 is a diagram showing an example of packet data called CreateJob transmitted from a terminal device on a LAN to the printing device using SOAP over HTTP;

FIG. 4 is a diagram showing an example of response packet data transmitted in response to the CreateJob packet in FIG. 3;

FIG. 6 is a diagram showing an example of a print data transfer packet transmitted from the terminal device using a POST method of HTTP;

FIG. 7 is a diagram showing an example of an HTTP response packet transmitted from the printing device in FIG. 1 to the terminal device;

FIG. 8 is a diagram showing an example of an error response packet transmitted from the printing device in FIG. 1 to the terminal device;

FIG. 9 is a diagram showing an example of start notification packet data transmitted from the printing device in FIG. 1;

FIG. 10 is a diagram showing an example of end notification packet data transmitted from the printing device in FIG. 1;

FIG. 11 is a diagram showing an example of a DDF in which printing device information is described;

FIG. 12 is a diagram showing an example of an SDF in which printing device service information is described;

FIG. 15 is a diagram showing an example of a DDF request transmitted from a terminal device;

FIG. 16 is a diagram showing an example of an SDF request transmitted from a terminal device;

DETAILED DESCRIPTION OF THE PREFERRED EMBODIMENTS

The present invention will now be described in detail with reference to the accompanying drawings showing a preferred embodiment thereof.

Figure 1:
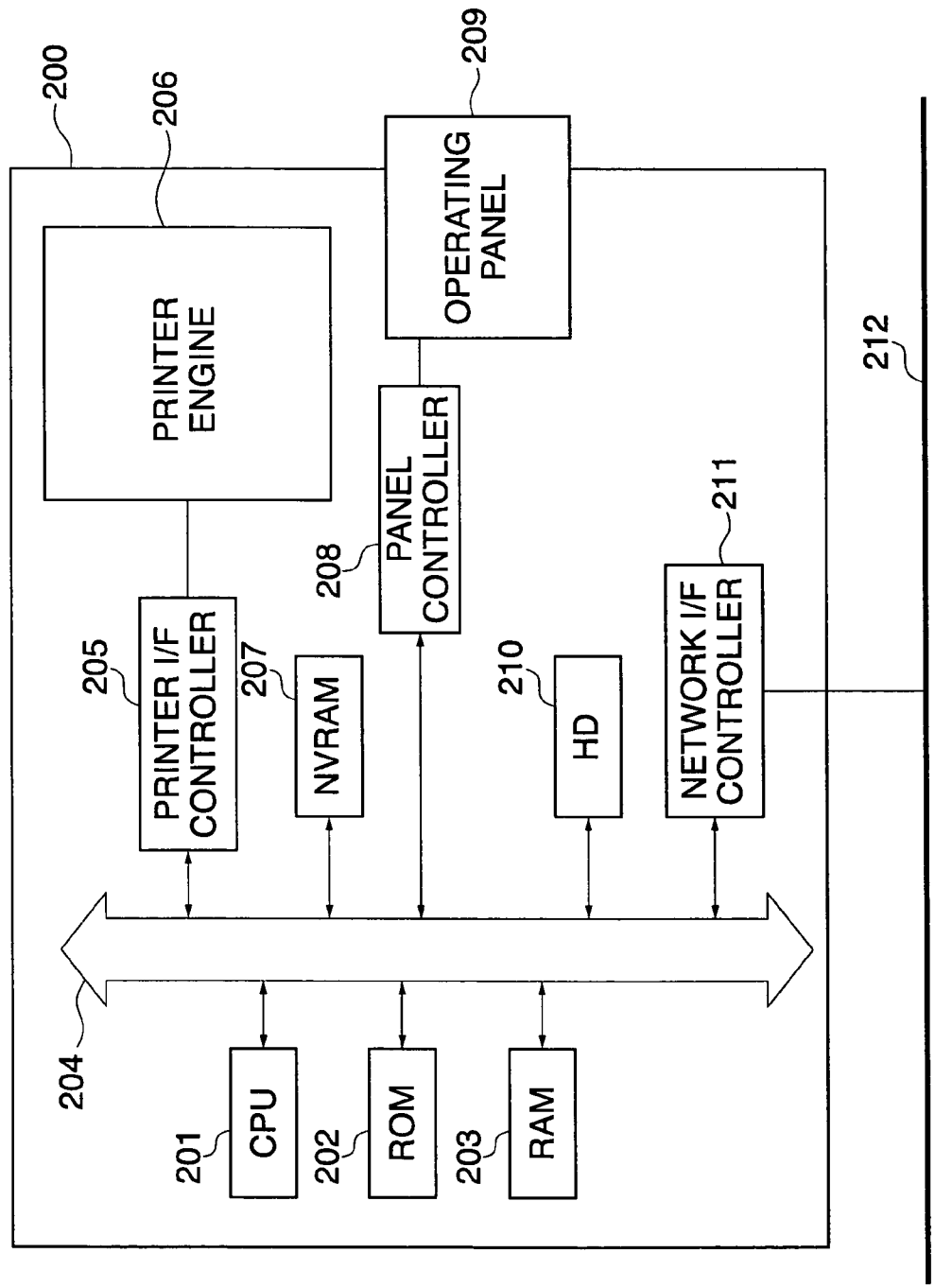
FIG. 1 is a block diagram showing the hardware configuration of a printing device as a service providing apparatus according to an embodiment of the present invention.

FIG. 1 is a block diagram showing the hardware configuration of a printing device as a service providing apparatus according to an embodiment of the present invention.

As shown in FIG. 1, the printing device 200 includes a CPU (Central Processing Unit) 201. The CPU 201 executes programs stored in a ROM (Read Only Memory) 202 or a hard disk (HD) 210 to collectively control devices connected to a system bus 204. A RAM (Random Access Memory) 203, a printer I/F controller 205, an NVRAM 207, a panel controller 208, and a network I/F controller 211, as well as the ROM 202 and the hard disk 210 are connected to the system bus 204. The RAM 203 functions as a main memory and a work area for the CPU 201. The printer I/C controller 205 controls a printer engine 206 in accordance with instructions from the CPU 201. Although not illustrated, a finisher unit which sorts and/or staples printed matters, a double-side printing unit, and so forth are attached to the printer engine 206. The NVRAM 207 is a nonvolatile memory for storing various set values of the printing device 200. The panel controller 208 controls the input/output of information to/from an operating panel 208, and controls the display of various kinds of information on the operating panel 209. The network I/F controller 211 controls the transmission/reception of data to/from a LAN (Local Area Network) 212.

Figure 2:
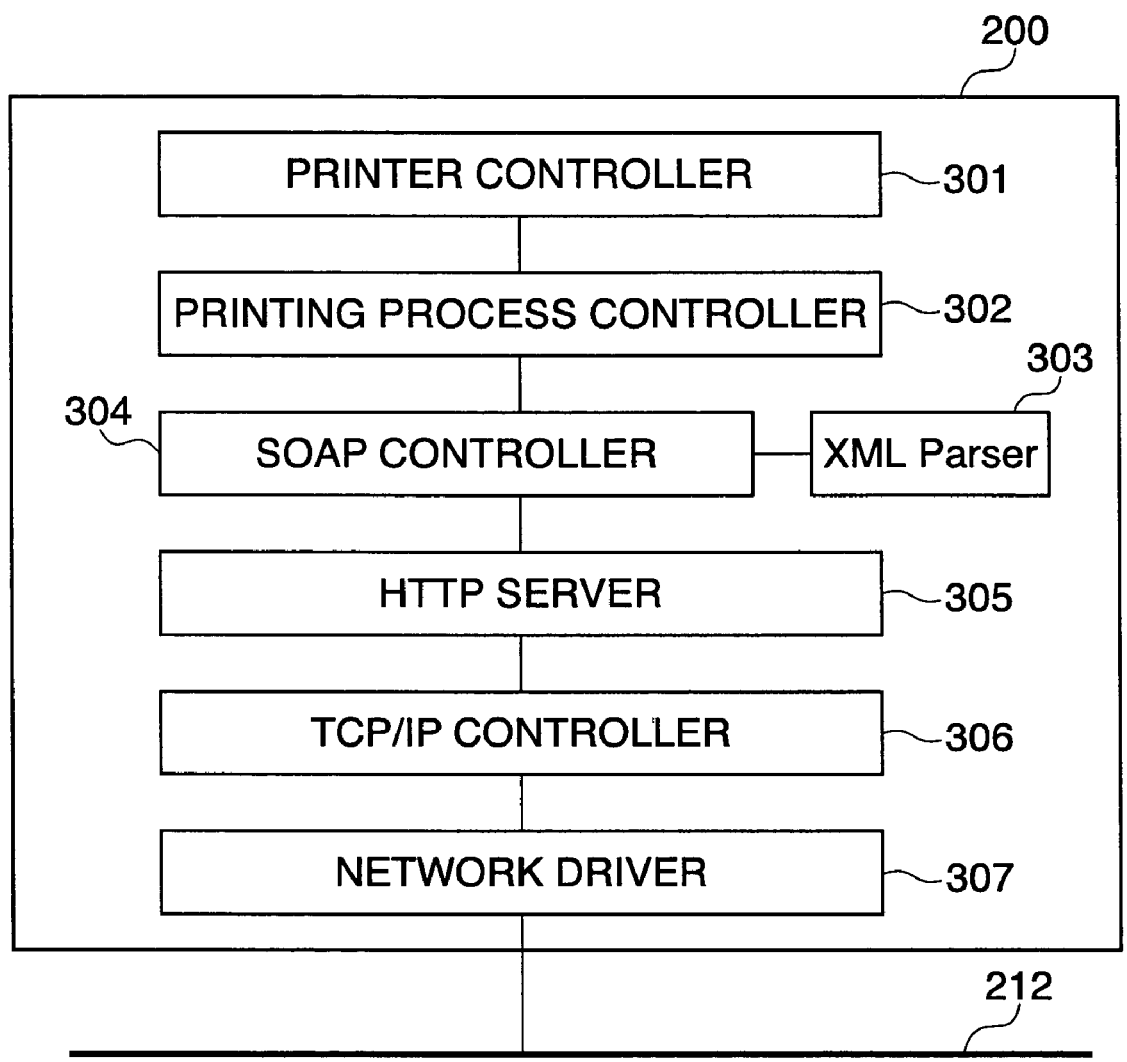
FIG. 2 is a block diagram showing the software configuration of the printing device in FIG. 1.

Referring to FIG. 2, a description will now be given of the software configuration of the printing device 200. FIG. 2 is a block diagram showing the software configuration of the printing device 200 in FIG. 1.

As shown in FIG. 2, if the CPU 201 executes the programs stored in the ROM 202 or the hard disk 210, modules such as a printer controller 301, a printing process controller 302, an XML parser 303, a SOAP controller 304, an HTTP server 305, a TCP/IP controller 306, and a network driver 307 are configured.

Here, the printer controller 301 controls the printer I/F controller 205 appearing in FIG. 1 to e.g. transmit data to the printer engine 206 and control the discharge of sheets. The printing process controller 302 converts received data into printable data, and provides various kinds of control relating to printing, such as the number of print copies and double-sided printing. The network driver 307 is a module for controlling the network I/F controller 211 appearing in FIG. 1 to carry out and control the transmission and reception of data to and from the LAN 212. The TCP/IP controller 306 controls the transmission and reception of data by TCP/IP. The HTTP server 305 having a HTTP server function, analyzes an HTTP request packet received from a terminal device on the LAN 212, transfers the data to a host application such as the SOAP controller 304 or the printing process controller 302, and returns a HTTP response packet to the terminal device in accordance with an instruction from the host application. The SOAP controller 304 is a module for controlling a protocol called SOAP (Simple Object Access Protocol). The SOAP controller 304 provides control to analyze data in XML (extensible Markup Language) format received from a terminal device on the LAN 212 using the XML parser 303, call a proper module of the printing process controller 302 using the XML parser 303, convert data which should be returned to the terminal device into XML data, and return the XML data to the terminal device via the HTTP server 305. The XML parser 303 is a module for receiving data in XML format, and outputting the result of XML data analysis.

Figure 5:
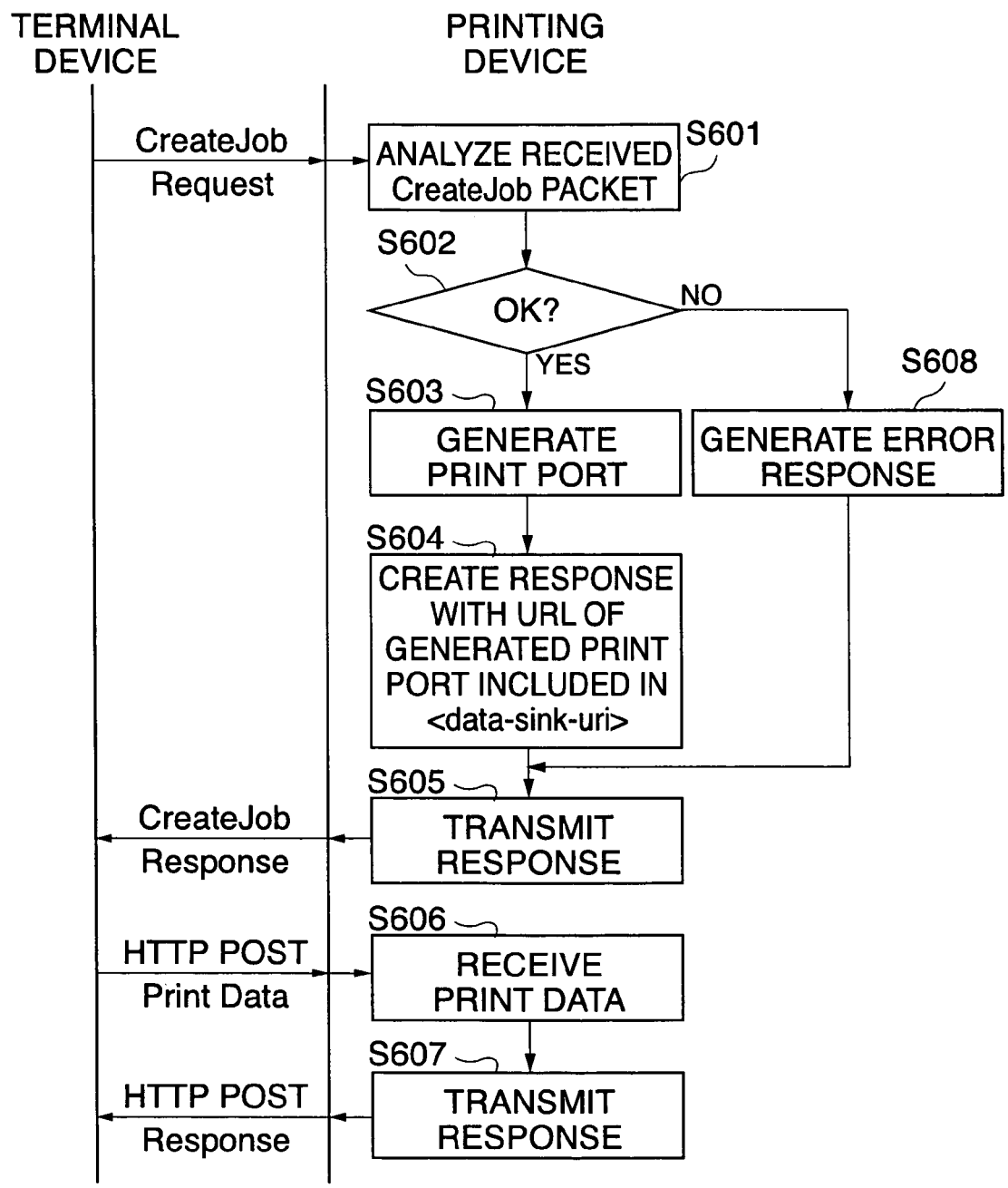
FIG. 5 is a flow chart showing an operating procedure performed by the printing device when the terminal device carries out printing using the printing device.

Referring next to FIGS. 3 to 8, a description will now be given of how a terminal device on the LAN 212 carries out printing using the printing device 200. FIG. 3 is a diagram showing an example of packet data called CreateJob transmitted from the terminal device on the LAN 212 to the printing device 200 using SOAP over HTTP, FIG. 4 is a diagram showing an example of response packet data transmitted in response to the CreateJob packet in FIG. 3, FIG. 5 is a flow chart showing an operating procedure performed by the printing device 200 when the terminal device carries out printing using the printing device 200, FIG. 6 is a diagram showing an example of a print data transfer packet transmitted from the terminal device using a POST method of HTTP, FIG. 7 is a diagram showing an example of an HTTP response packet transmitted from the printing device 200 in FIG. 1 to the terminal device, and FIG. 8 is a diagram showing an example of an error response packet transmitted from the printing device 200 in FIG. 1 to the terminal device. Here, the operating procedure in FIG. 5 performed by the printing device 200 is executed by the CPU 201 in accordance with a program stored in the ROM 202 or the HD 210.

In the case where the terminal device on the LAN 212 carries out printing using the printing device 200, packet data called CreateJob is transmitted from the terminal device using SOAP over HTTP. The CreateJob packet is a command which instructs the printing device 200 to start a job (printing), and is described in XML format. As shown in FIG. 3, the CreateJob packet describes information such as the name of a requesting user (<requesting-user-name> tag), and instructions relating to processing of the job (<job-instruction> tag). The <job-instruction> tag includes a <copies> tag which sets the number of print copies, a <sides> tab which sets double-sided printing, and a <finishing> tag which sets finishing of printing. The printing device 200 processes the job according to values set in these tags. The <job-instruction> tab may optionally include a <notification-instruction> tag. The <notification-instruction> tag describes notification information relating to the job. In the example shown in FIG. 3, a <notification-recipient> which sets a recipient of notification, and an <event> tag which sets notification conditions are described as the notification information. The printing device 200 carries out an event transmitting process according to values set in these tags.

Upon reception of the CreateJob packet from the terminal device, the printing device 200 returns a CreateJob response packet to the terminal device. As shown in FIG. 4, the CreateJob response packet returned in response to the CreateJob packet is described in XML format as is the case with the above CreateJob packet data, and is transmitted using SOAP over HTTP. The CreateJob response packet includes information such as a result code for the CreateJob command (<result-code> tag), a generated job identifier (<job-id> tag), and a print port URI (<data-sink-uri> tag).

A concrete description will now be given of how the printing device 200 operates when a terminal device on the LAN 212 carries out printing using the printing device 200.

Upon reception of a CreateJob packet as shown in FIG. 3 transmitted from the terminal device (host computer) on the LAN 212, the printing device 200 analyzes XML data of the received CreateJob packet in a step S601 as shown in FIG. 5. Then, the printing device 200 determines in a step S601 whether the analysis result contains an error or not. If the analysis result contains no error, the printing device 200 generates a print port for receiving print data in a step S603.

Then, in a step S604, the printing device 200 generates XML data as CreateJob response data. On this occasion, the URI of the print port generated for receiving print data is set as a value in the <data-sink-uri> tag. For example, a URI as shown in FIG. 4 is embedded in the XML data. Then, in a step S605, the printing device 200 transmits the CreateJob response data generated in the step S604 to the terminal device using SOAP. The terminal device receives the CreateJob response data, and transmits print data to the URI designated by the <data-sink-uri> tag included in the CreateJob response data using the POST method of HTTP. This print data transfer packet transmitted using the POST method of HTTP is configured as shown in FIG. 6.

Then, in a step S606, the printing device 200 receives the data which has reached the print port, and causes the printer engine 206 to carry out printing while performing suitable processing on the received data. When the reception of the print data has been normally completed, in a step S607, the printing device 200 transmits an HTTP response packet as shown in FIG. 7 to the terminal device, and deletes (closes) the print port and completes printing.

On the other hand, if it is determined in the step S602 that the XML data of the CreateJob packet contains an error, the printing device 200 generates error response data as shown in FIG. 8 in a step S608. The printing device 200 then transmits the error response data to the terminal device in the step S605. Upon reception of the error response data, the terminal device terminates its operation without transmitting print data.

In the present embodiment, the printing device 200 transmits a start notification which notifies terminal devices on the LAN 212 that service has been started. After the start of service is notified using the start notification, a terminal device which uses service acquires a DDF and an SDF from the printing device 200, and acquires and registers the contents of service provided by the printing device 200. The terminal device then makes settings as to double-sided printing and finishing in the CreateJob packet as shown in FIG. 3 according to the registered contents of service provided by the printing device 200.

Referring to FIGS. 9 to 12, a description will now be given of a start notification given at the start of the printing device 200, as well as the DDF and the SDF. FIG. 9 is a diagram showing an example of start notification packet data transmitted from the printing device 200, FIG. 10 is a diagram showing an example of end notification packet data transmitted from the printing device 200, FIG. 11 is a diagram showing an example of the DDF in which printing device information is described, and FIG. 12 is a diagram showing an example of the SDF in which printing device service information is described.

The printing device 200 transmits start notification packet data to all of terminal devices on the LAN 212 by HTTP multicast (hereinafter referred to as "HTTPMU"). As shown in FIG. 9, the start notification packet data is described at the header of an HTTP protocol (Notify method of HTTP), and contains no body of HTTP. The start notification packet is a command which notifies the terminal devices of the presence of the printing device 200 and the start of service, and describes information such as the expiration date of the start notification (Cache-Control: max-age=[the number of seconds indicative of the expiration date], the URL of the DDF as the location information for acquiring the DDF (Location: HTTP://host:port/DDF; file path), information which indicates that the printing device 200 and its service has been started (NTS: ssdp: alive). The expiration date of the start notification may indicates the expiration data of the DDF of the service. The start notification packet data notifies respective objects to be started such as a root device, a device UUID, other devices, and services of the printing device 200. These objects are described as start object information (NT: the names of objects to be started) to be identified. In the example of the start notification packet data in FIG. 9, only a notification of the start of the printing device 200 is described.

The start notification packet data as above is the same as update notification packet data which is transmitted so as to update the expiration date of a start notification.

The printing device 200 also transmits end notification packet data to all of the terminal devices by HTTPMU. As is the case with the start and update notification packet data, the end notification packet data is described at the header of the HTTP protocol (Notify method of HTTP), and contains no body of HTTP. The end notification packet data is a command for notifying the terminal devices that service has ended, and describes information which indicates that the printing device 200 and its service are brought to an end (NTS:ssdp;byebye).

Upon reception of a DDF acquisition request from a terminal device, the printing device 200 transmits a DDF in which device information on the printing device 200 is described to the terminal device. The DDF data is described in XML format, and is created according to device profile information such as setting information stored in advance in the NVRAM 207, the HD 210, the ROM 202, and so forth within the printing device 200, and status information held in the operating printing device 200. As shown in FIG. 11, described in the DDF are device-related information such as URL information based on which the printing device 200 is accessed (<URLBase> tag) and device type information on the printing device 200 (<deviceType> tag), and information on a service provided by the printing device 200 (<ServiceList> tag).

In the DDF, the contents of a service provided by the printing device 200 are described in a region enclosed in a <service> tag. In the present embodiment, the printing device 200 provides a printing service, and thus information indicative of the provision of the printing service and others are described within the <service> tag of the DDF. In the case where the printing device 200 provides a plurality of services such as a scanning service and a storage service, information on these services is additionally described in the region enclosed by the <service> tag. The information on the services includes URL information indicative of the locations of SDFs of the respective services <SCPDURL> so that the terminal device can acquire the SDFs of the respective services provided by the printing device 200 according to the above information. Further, organization information indicative of the location of the printing device 200 (<BM:X_organization> tag), information indicative of characters to be supported (<profile-charaset> tag), language information (profile-language> tag), and so forth are described in the DDF.

In the SDF, service information on the printing device 200 is described in XML format. In the present embodiment, the printing device 200 provides the printing service, and hence as shown in FIG. 12, information on the printing service provided by the printing device 200 is described in the SDF. The SDF is created according to device profile information such as setting information stored in advance in the NVRAM 207, the HD 210, the ROM 202, and so forth within the printing device 200, and status information held in the operating printing device 200. In the SDF, the details of service provided by the printing service 200 are described as respective items written in <name> tags within areas enclosed in <stateVariable> tags. In the SDF according to the present embodiment, information indicative of the format of print documents to be supported (<name>document-format</name>), information indicative of whether to perform color printing and the maximum number of colors (<name>colors</name>), information indicative of whether to perform monochromatic printing and the maximum number of gradations (<name>gray-levels</name>), information indicative of a finishing function (<name>finish</name>) and a double-sided printing function (<name>side</name>), and so forth are described as items of detailed information on the printing service. In the example of the SDF shown in FIG. 12, only an item representative of whether to perform color printing and the maximum number of colors (<name>colors</name>) are shown, but actually, other items are also included. The above described SDF enables a terminal device to retrieve and select a printing device with a desired printing function, and to carry out printing using the selected printing device.

Figure 13:
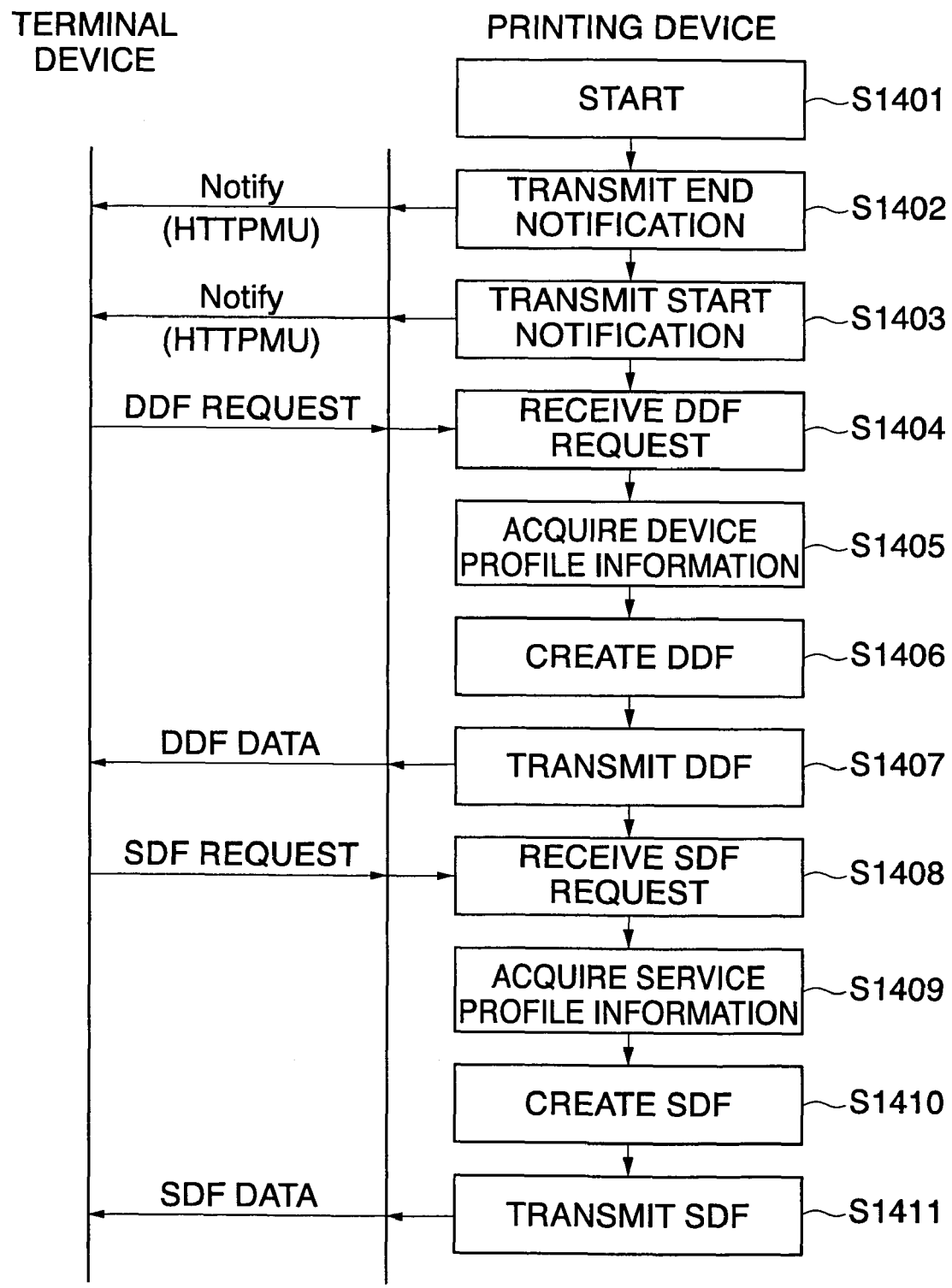
FIG. 13 is a flow chart showing a procedure for transmitting end notification, start notifications, DDF, and SDF when the printing device in FIG. 1 is started.

Referring next to FIGS. 13, 15, and 16, a description will be given of how an end notification, start notification, DDF, and SDF are transmitted at the start of the printing device 200. FIG. 13 is a flow chart showing a procedure for transmitting an end notification, start notification, DDF, and SDF at the start of the printing device in FIG. 1, FIG. 15 is a diagram showing an example of a DDF request transmitted from a terminal device, and FIG. 16 is a diagram showing an example of an SDF request transmitted from a terminal device. Here, the operating procedure in FIG. 13 performed by the printing device 200 is executed by the CPU 201 in accordance with a program stored in the ROM 202 or the HD 210.

As shown in FIG. 13, when power supply to the printing device 200 is turned on, the printing device 200 starts the printing service (or the printing device 200 is started) in a step S1401, and then transmits an end notification packet to all of the terminal devices on the LAN 212 by HTTPMU. The end notification packet notifies the terminal devices that a start notification (service) of the printing device 200 registered in the terminal devices before the start of the printing device 200 has ended. In the printing device 200, device information on the printing device 200 and the contents of the service provided by the printing service 200 before the start of the printing device (step S1401) may be different from those after the start of the printing device 200 (step S1401) due to a change in the status of the printing device 200 during power-off. Even in this case, the end notification as above enables the terminal devices to end the service provided before the start of the printing device 200 (step S1401), and to acquire the updated contents of the service provided by the printing device 200 (the contents of the service provided after the start of the printing device 200).

Then, in a step S1403, the printing device 200 transmits a start notification packet as shown in FIG. 9 to all of the terminal devices on the LAN 212 by HTTPMU. A terminal device which has received the start notification packet transmits a DDF request to the printing device 200 by unicast. As shown in FIG. 9, a URL indicative of the location of a DDF in the printing device 200 is described in the start notification packet, and hence the terminal device transmits a DDF request according to this URL information. The DDF request is the header of a GET method of HTTP, and for example, is configured as shown in FIG. 15.

Then, in a step S1404, the printing device 200 receives the DDF request transmitted from the terminal device, and in a step S1405, the printing device 200 acquires device profile information such as setting information stored in advance in the NVRAM 207, the HD 210, the ROM 202, and so forth within the printing device 200, and status information held in the printing device 200 being operated. The acquired device profile information is stored in an internal memory such as the RAM 203. Then, in a step S1406, the printing device 200 generates a DDF as shown in FIG. 11 based on the device profile information acquired in the step S1405.

Then, in a step S1407, the printing device 200 returns the DDF generated in the step S1406 as a response to the DDF request to the terminal device which has made the DDF request. The terminal device which has acquired the DDF transmits an SDF request to the printing device 200 by unicast as is the case with the DDF request. Since a URL indicative of the location of an SDF in the printing device 200 is described in the DDF as shown in FIG. 11, the terminal device transmits the SDF request according to this URL information. As is the case with the DDF request, the SDF request is the header of a GET method based on HTTP, and for example, is configured as shown in FIG. 16.

Then, in a step S1408, the printing device 200 receives the SDF request transmitted from the terminal device, and in a step S1409, the printing device 200 acquires device profile information such as setting information stored in advance in the NVRAM 207, the HD 210, the ROM 202, and so forth within the printing device 200, and status information held in the printing device 200 being operated. The acquired device profile information is stored in an internal memory such as the RAM 203. Then, in a step S1410, the printing device 200 generates an SDF as shown in FIG. 12 based on the device profile information acquired in the step S1409.

Then, in a step S1411, the printing device 200 returns the SDF generated in the step S1410 as a response to the SDF request to the terminal device which has made the SDF request.

In the above sequence, the printing device 200 transmits a start notification, and the terminal device acquires a DDF and an SDF.

In FIG. 13, only one terminal device is illustrated, but if a plurality of terminal devices exist on the LAN 212, each of the terminal devices operates in the same manner as above. Further, in the present embodiment, an SDF request is made for a single service, but if the printing device 200 is capable of providing a plurality of services, an SDF request is transmitted for each of the services, and in response, a requested SDF for each of the services is transmitted.

Figure 14:
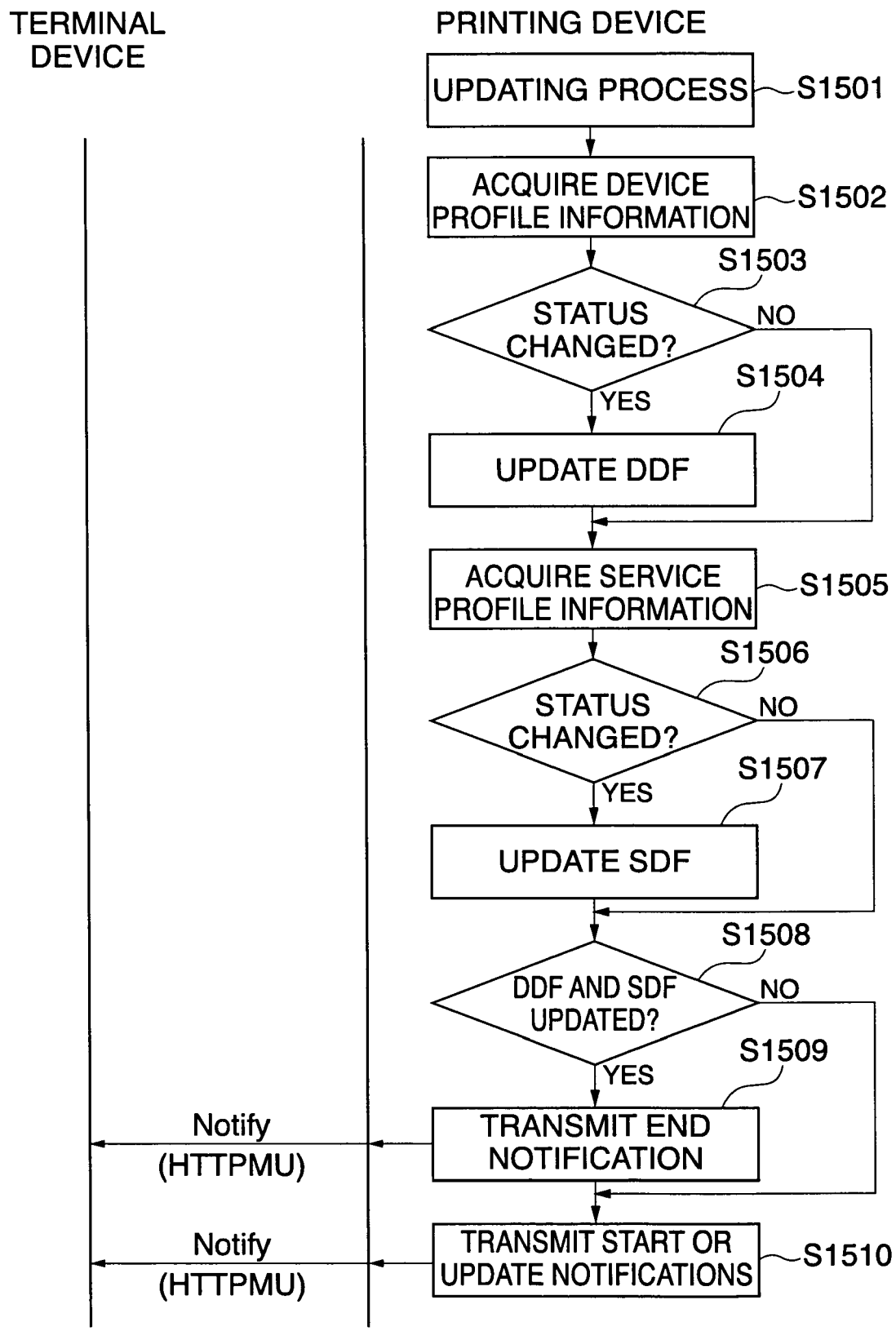
FIG. 14 is a flow chart showing an operating procedure performed by the printing device in FIG. 1 when the expiration date of a start notification given by the printing device in FIG. 1 is renewed.
Figure 17A:
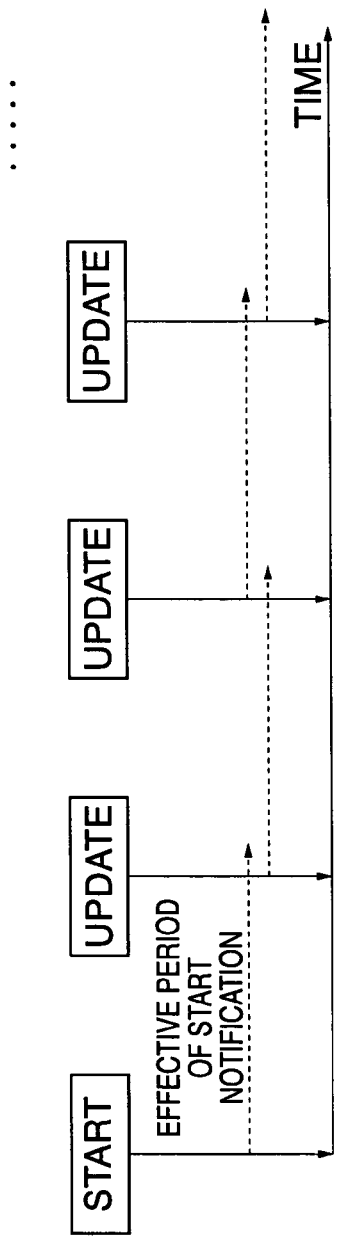
FIG. 17A is a diagram showing timing in which the start of a conventional printing device and the start of service are notified.
Figure 17B:
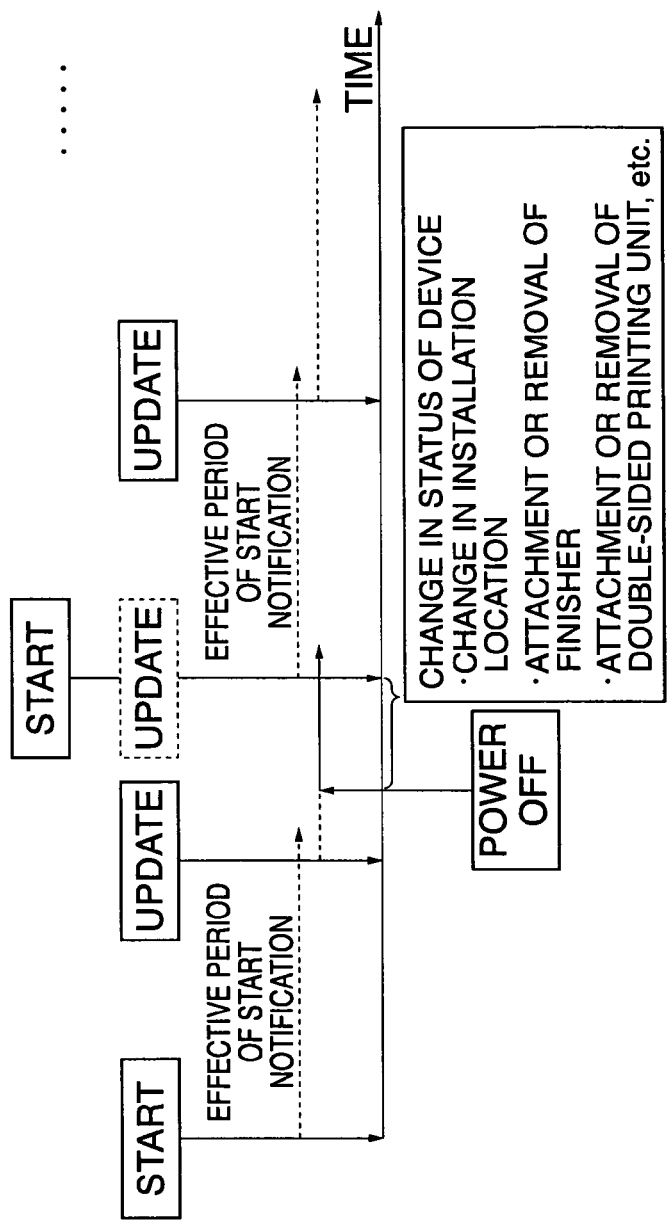
FIG. 17B is a diagram showing timing in which the start of the printing device and the start of service are notified in the case where a finisher unit which sorts and/or staples printed matters or a double-sided printing unit is attached or removed after power supply to the printing device is turned off.

Referring next to FIG. 14, a description will be given of how the printing device 200 operates to update the expiration date of a start notification given by the printing device 200. FIG. 14 is a flow chart showing an operating procedure performed by the printing device 200 when the expiration date of a start notification given by the printing device 200 is updated. Here, the operating procedure in FIG. 14 performed by the printing device 200 is executed by the CPU 201 in accordance with a program stored in the ROM 202 or the HD 210.

After a start notification is given, if the time to update the expiration data of the start notification comes, the printing device 200 starts a updating process in a step S1501 as shown in FIG. 14 so as to send the start notification packet or the update notification packet in accordance with whether or not at least one of DDF and SDF is updated. The time to update comes immediately before the effective period of the service given by the printing device 200 expires. Then, the printing device 200 acquires its device profile information in a step S1502. The printing device 200 then compares the previous device profile information stored in a memory such as the RAM 203 (device profile information acquired in the step S1405 in FIG. 13) and the device profile information acquired this time with each other to determine whether or not there is a change in the status of the printing device 200 in step S1503.

If there is a change in the status of the printing device 200, the printing device 200 determines that device information on the printing device 200 has been updated, and updates the DDF in a step S1504. The process then proceeds to a step S1505.

On the other hand, if it is determined in the step S1504 that there is no change in the status of the printing device 200, the process proceeds to the step S1505 with the step S1504 being skipped.

The printing device 200 acquires its service profile information in the step S1505, and then in a step S1506, compares the previous device profile information stored in a memory such as the RAM 203 (service profile information acquired in the step S1409 in FIG. 13) and the service profile information acquired this time with each other to determine whether or not there is a change in the status of the printing device 200. If there is a change in the status of the printing device 200, the printing device 200 determines that the contents of service have been updated, and updates the SDF in a step S1507. The process then proceeds to a step S1508.

On the other hand, if it is determined in the step S1506 that there is no change in the status of the printing device 200, the process proceeds to the step S1508 with the step S1507 being skipped.

In the step S1508, the printing device 200 determines whether the DDF and the SDF have been updated or not. If the DDF and the SDF have been updated, the printing device 200 transmits an end notification packet as shown in FIG. 10 to all of the terminal devices on the LAN 212 by HTTPMU in a step S1509. As a result, the end of the start notification transmitted before the updating process is notified to the terminal devices. Then, in a step S1510, the printing device 200 transmits a start notification packet as shown in FIG. 9 by HTTPMU to give a new start notification.

On the other hand, if it is determined in the step S1508 that the DDF and the SDF have not been updated, the process proceeds to the step S1510 with the step S1509 being skipped, so that the printing device 200 transmits an update notification packet to update expiration data of start notification.

The updating process is carried out after the printing device 200 is started to give a start notification, and the same process is carried out again immediately before the effective period of the start notification expires. The time to update, however, is not limited to this, but may be set such that the process is carried out many times within the effective period.

As described above, according to the present embodiment, after starting the printing service (step S1401), and transmitting an end notification packet to all of the terminal devices on the LAN 212 so as to nullify the contents of service registered in the terminal devices (step S1402), the printing device 200 transmits a start notification packet to the terminal devices (step S1403). Therefore, even in the case where the contents of the printing service provided for the terminal devices have been changed, the changed contents of the printing service can be reliably registered in the terminal devices.

Further, in the case where the contents of service have been changed by the updating process according to the result of detection as to whether the contents of service have been changed or not, a start notification packet is transmitted to the terminal devices after an end notification packet to the terminal devices. Therefore, even in the case where the contents of the printing service have been changed due to a change in the status of the printing device within the effective period of the printing service, the changed contents of the printing service can be reliably registered in the terminal devices.

Although in the present embodiment, a start notification and an end notification are given to all of terminal devices on a network by multicast, the present invention is not limited to this, but in the case where there is a server apparatus which provides a service searching service in which services provided by printing devices and others on the network are registered, a service search request from the terminal devices is accepted, and information on devices which provide service conforming to search conditions is returned, the terminal devices may register information on the server apparatus in advance, so that the designated server apparatus give a start notification and an end notification by unicast.

Further, although in the present embodiment, the printing device provides only the printing service on the network, a plurality of services including the printing service may be provided if a service providing device capable of providing a plurality of services such as a printing service, a scanning service, and a storage service carries out the same operation as in the printing device described above.

It is to be understood that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code is supplied by downloading via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A service providing apparatus capable of communicating with at least one terminal apparatus via a network, and providing at least one service using functions of the service providing apparatus itself, the service providing apparatus comprising:

a printing hardware unit that provides a printing function as a service among the at least one service;

a service start notifying unit that transmits a service start notification for notifying that the service has been started on the printing hardware unit to the at least one terminal apparatus;

a receiving unit that receives an acquisition request for acquiring contents of the service corresponding to the service start notification from the at least one terminal apparatus, the acquisition request being transmitted from the at least one terminal apparatus in response to the notification by said service start notifying unit in a case where contents of the service are not registered in the at least one terminal apparatus;

a service contents acquiring unit that acquires contents of the service which are providable to the at least one terminal apparatus in response to reception of the acquisition request by said receiving unit;

a service contents notifying unit that notifies contents of the service acquired by said service contents acquiring unit to the at least one terminal apparatus; and a service end notifying unit that transmits to the at least one terminal apparatus a service end notification for nullifying the contents of the service registered in the at least one terminal apparatus, wherein upon powering on the printing hardware unit to start the service, said service end notifying unit transmits the service end notification to the at least one terminal apparatus before said service start notifying unit transmits the service start notification to the at least one terminal apparatus for causing the at least one terminal to nullify the registered service, and then said service start notifying unit transmits the service start notification to the at least one terminal apparatus immediately after sending the service end notification for causing the at least one terminal to transmit the acquisition request to the printing hardware unit.

2. A service providing apparatus according to claim 1, further comprising an update processing unit that carries out an updating process for updating the contents of the service after the service start notification is transmitted, wherein in a case where the contents of the service have been updated, said service end notifying unit transmits the service end notification, and then said service start notifying unit transmits the service start notification.

3. A service providing apparatus according to claim 2, further comprising a notifying unit that transmits to the at least one terminal apparatus a notification indicating that the contents of the service registered in the at least one terminal apparatus are effective, wherein in a case where the contents of the service have been unchanged, said notifying unit transmits the notification to the at least one terminal apparatus.

4. A service providing apparatus according to claim 3, further comprising a status change determining unit that regularly makes a determination as to whether there is a change in status of the printing hardware unit, wherein in a case where said status change determining unit determines that there is a change in status of the printing hardware unit, said update processing unit updates the contents of the service, said service end notifying unit transmits the service end notification, and then said service start notifying unit transmits the service start notification.

5. A service providing apparatus according to claim 4, wherein said status change determining unit makes the determination at intervals corresponding to an effective period of the service.

6. A service providing apparatus according to claim 1, wherein:

the at least one terminal apparatus is connected to the network, said service start notifying unit transmits the service start notification to the at least one terminal apparatus connected to the network, said service end notifying unit transmits the service end notification to the at least one terminal apparatus connected to the network, the at least one terminal apparatus nullifies the service information registered in the at least one terminal apparatus in accordance with the service end notification, and upon powering on the printing hardware unit, said service end notifying unit transmits the service end notification to the network, and then said service start notifying unit transmits the service start notification to the network.

7. An information processing method that enables a service providing apparatus communicable with at least one terminal apparatus via a network to provide at least one service using functions of the service providing apparatus itself, the service providing apparatus comprising a printing hardware unit that provides a printing function as a service among the at least one service, the method comprising the steps of:

transmitting a service start notification for notifying that the service has been started on the printing hardware unit to the at least one terminal apparatus;

receiving an acquisition request for acquiring contents of the service corresponding to the service start notification from the at least one terminal apparatus, the acquisition request being transmitted from the at least one terminal apparatus in response to the notification of the service start notification in a case where contents of the service are not registered in the at least one terminal apparatus;

acquiring contents of the service providable to the at least one terminal apparatus in response to reception of the acquisition request;

notifying the acquired contents of the service to the at least one terminal apparatus;

transmitting to the at least one terminal apparatus a service end notification for nullifying the contents of the service registered in the at least one terminal apparatus, wherein upon powering on the printing hardware unit to start the service, the service end notification transmitting step transmits the service end notification to the at least one terminal apparatus before the service start notification transmitting step transmits the service start notification to the at least one terminal apparatus for causing the at least one terminal to nullify the registered service, and then said service start notification transmitting step transmits the service start notification to the at least one terminal apparatus immediately after sending the service end notification for causing the at least one terminal to transmit the acquisition request to the printing hardware unit.

8. A non-transitory computer-readable medium storing a computer program for a service providing apparatus communicable with at least one terminal apparatus via a network to provide at least one service using functions of the service providing apparatus itself, the service providing apparatus comprising a printing hardware unit that provides a printing function as a service among the at least one service, the computer program comprising:

a service start notifying module for transmitting a service start notification for notifying that the service has been started on the printing hardware unit to the at least one terminal apparatus;

a receiving module for receiving an acquisition request for acquiring contents of the service corresponding to the service start notification from the at least one terminal apparatus, the acquisition request being transmitted from the at least one terminal apparatus in response to the notification of the service start notification in a case where contents of the service are not registered in the at least one terminal apparatus;

an acquiring module for acquiring contents of the service providable to the at least one terminal apparatus in response to reception of the acquisition request;

a service contents notifying module for notifying the acquired contents of the service to the at least one terminal apparatus; and a service end notifying module for transmitting the at least one terminal apparatus a service end notification for nullifying the contents of the service registered in the at least one terminal apparatus, wherein upon powering on the printing hardware unit to start the service, the service end notifying module transmits the service end notification to the at least one terminal apparatus before the service start notifying module transmits the service start notification to the at least one terminal apparatus for causing the at least one terminal to nullify the registered service, and then the service start notifying module transmits the service start notification to the at least one terminal apparatus immediately after sending the service end notification for causing the at least one terminal to transmit the acquisition request to the printing hardware unit.

* * * * *